(12) United States Patent
Kishiyama et al.

(10) Patent No.: US 8,705,462 B2
(45) Date of Patent: Apr. 22, 2014

(54) USER EQUIPMENT TERMINAL, BASE STATION AND CONTROL INFORMATION TRANSMISSION METHOD

(75) Inventors: Yoshihisa Kishiyama, Yokosuka (JP); Satoshi Nagata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 544 days.

(21) Appl. No.: 12/681,039

(22) PCT Filed: Sep. 29, 2008

(86) PCT No.: PCT/JP2008/067680
§ 371 (c)(1),
(2), (4) Date: Jun. 29, 2010

(87) PCT Pub. No.: WO2009/044710
PCT Pub. Date: Apr. 9, 2009

(65) Prior Publication Data
US 2010/0260119 A1    Oct. 14, 2010

(30) Foreign Application Priority Data
Oct. 1, 2007  (JP) .................................. 2007-258110

(51) Int. Cl.
*H04W 4/00* (2009.01)

(52) U.S. Cl.
USPC ............ 370/329; 370/338; 370/341; 370/348

(58) Field of Classification Search
USPC .......................... 370/203, 329, 343, 347, 338;
455/67.11, 67.13, 447, 450; 375/132
See application file for complete search history.

(56) References Cited

U.S. PATENT DOCUMENTS

| | | | |
|---|---|---|---|
| 2006/0148411 A1* | 7/2006 | Cho et al. | 455/67.13 |
| 2006/0203891 A1* | 9/2006 | Sampath et al. | 375/132 |
| 2007/0026810 A1* | 2/2007 | Love et al. | 455/67.11 |
| 2007/0217388 A1 | 9/2007 | Shiizaki et al. | |
| 2007/0218917 A1* | 9/2007 | Frederiksen et al. | 455/450 |
| 2007/0291720 A1* | 12/2007 | Lee | 370/338 |
| 2008/0219236 A1* | 9/2008 | Love et al. | 370/347 |
| 2008/0233964 A1* | 9/2008 | McCoy et al. | 455/450 |
| 2008/0267057 A1* | 10/2008 | Kotecha | 370/203 |
| 2008/0311919 A1* | 12/2008 | Whinnett et al. | 455/447 |
| 2011/0281605 A1 | 11/2011 | Shiizaki et al. | |

FOREIGN PATENT DOCUMENTS

| | | |
|---|---|---|
| CN | 101039166 A | 9/2007 |
| EP | 1 990 942 A1 | 11/2008 |
| JP | 2007-043696 A | 2/2007 |
| JP | 2007-166118 A | 6/2007 |
| WO | 2007/108473 A1 | 9/2007 |

OTHER PUBLICATIONS

Japanese Office Action for Application No. 2010-249701, mailed on Jul. 31, 2012 (7 pages).

(Continued)

*Primary Examiner* — Brian D Nguyen
*Assistant Examiner* — Toan Nguyen
(74) *Attorney, Agent, or Firm* — Osha Liang LLP

(57) ABSTRACT

A user equipment terminal for transmitting control information to a base station according to a single carrier scheme includes a wideband control information generating unit configured to generate wideband control information for a whole system band or a portion thereof; a frequency-selective control information generating unit configured to generate frequency-selective control information; and a control unit configured to control the wideband control information to be transmitted on a control channel or a data channel and control the frequency-selective control information to be transmitted on the data channel.

5 Claims, 10 Drawing Sheets

(56) References Cited

OTHER PUBLICATIONS

Motorola, "Joint feedback for E-UTRA downlink precoding and CQI", 3GPP TSG RAN1# 48 bis, R1-071344, St. Julian's Malta, Mar. 26-30, 2007.
Motorola, "Joint feedback for E-UTRA downlink precoding and CQI", 3GPP TSG RAN1# 49, R1-072176, Kobe, Japan, May 7-11, 2007.
Motorola, "Joint feedback for E-UTRA downlink precoding and CQI", 3GPP TSG RAN1#50, R1-073383, Athens, Greece, Aug. 20-24, 2007.
Motorola, "Joint feedback for E-UTRA downlink precoding and CQI", 3GPP TSG RAN1# 49 bis, R1-072701, Orlando, Florida, Jun. 25-29, 2007.
Japanese Office Action for Application No. 2010-249701, mailed on Apr. 17, 2012 (5 pages).
Ericsson, "On CQI Reporting" 3GPP TSG-RAN WG1 Meeting #50, R1-073746, Athens, Greece, Aug. 20-24, 2007.
Ericsson, CATT, Freescale Semiconductor, Huawei, Icera Semiconductor, LGE, Motorola, Nokia, Nokia Siemens Network, Nortel, NTT DOCOMO, Panasonic, Philips, Qualcomm Europe, Samsung, Texas Instruments, ZTE, "Way Forward for CQI Reporting" 3GPP TSG-RAN WG1 Meeting #50, R1-073844, Athens, Greece, Aug. 20-24, 2007.
Ericsson, Alcatel-Lucent, CATT, Freescale Semiconductor, Huawei, Icera Semiconductor, Interdigital, IPWireless, LGE, Mitsubishi, Motorola, Nextwave, Nokia, Nokia Siemens Network, Nortel, NTT DOCOMO, Panasonic, Philips, Qualcomm Europe, Samsung, Sharp, Texas Instruments, ZTE, "Way Forward for CQI Reporting" 3GPP TSG-RAN WG1 Meeting #50, R1-073858, Athens, Greece, Aug. 20-24, 2007.
Patent Abstracts of Japan, Publication No. 2007-043696, dated Feb. 15, 2007, 1 page.
Patent Abstracts of Japan, Publication No. 2007-166118 dated Jun. 28, 2007, 1 page.
3GPP TR 25.814 V7.0.0, Jun. 2006, "Physical layer aspects for evolved Universal Terrestrial Radio Access (UTRA)," 126 pages.
3GPP TSG RAN WG1 Meeting #47 bis, R1-070100, Sorrento, Italy, Jan. 15-19, 2007, "CDMA—Based Multiplexing Method for Multiple ACK/NACK and CQI in E-UTRA Uplink," 7 pages.
International Search Report issued in PCT/JP2008/067680, mailed on Dec. 9, 2008, 6 pages.
Written Opinion issued in PCT/JP2008/067680, mailed on Dec. 9, 2008, 4 pages.
Chinese Office Action for Application No. 200880118239.1, mailed on Jul. 13, 2012, with translation, 8 pages.
esp@cenet Patent Abstract for Chinese Publication No. 101039166, publication date Jul. 19, 2007. (1 page).

* cited by examiner

FIG.6

| CONTROL SIGNALING INFORMATION | NUMBER OF BITS | NOTE |
|---|---|---|
| SCHEDULING GRANT FORMAT | 1 | INDICATE USE FOR UL GRANT OR DL GRANT |
| UPLINK RESOURCE BLOCK ASSIGNMENT INFORMATION | $\log_2(N_{RB}(N_{RB}+1)/2)$ 9, 11, 13 FOR 5, 10, 20 MHz | TREE-BASED MAPPING IS ASSUMED |
| UE ID | 16 | CORRESPOND TO CRC LENGTH |
| TRANSPORT FORMAT INFORMATION | 6 (OR LESS) | 2 BITS ARE USED FOR MODULATION SCHEME AND 4 BITS ARE USED FOR PAYLOAD SIZE |
| TRANSMISSION POWER | 3 | TO CONTROL TRANSMISSION POWER OF UPLINK DATA CHANNEL AND ACK/NACK SIGNAL ABSOLUTE VALUE FOR RESIDUAL INSTANTANEOUS FADING IS COMPENSATED |
| DEMODULATION REFERENCE SIGNAL FORMAT | 3 | SELECTION FROM DIFFERENT CYCLIC SHIFT INDICATES FOR MU-MIMO |
| TTI HOPPING INFORMATION (INTRA-TTI HOPPING) | 0 | USE OF TTI HOPPING IS INDICATED BY HIGH-LAYER CONTROL SIGNALING |
| UPLINK ANTENNA SELECTION INFORMATION | 1 | INDICATE SELECTED ANTENNA FOR UL ANTENNA SWITCHING |
| CQI INDICATION | 1 | INDICATES WHETHER CQI REPORT IS TRANSMITTED IN PUSCH |
| RETRANSMISSION-RELATED INFORMATION (HARQ-RELATED INFORMATION) | 2 | INDICATE REDUNDANCY VERSION (RV) FOR ADAPTIVE ARQ |

FIG.7

| CONTROL SIGNALING INFORMATION | NUMBER OF BITS | NOTE |
|---|---|---|
| SCHEDULING GRANT FORMAT | 0 | |
| UPLINK RESOURCE BLOCK ASSIGNMENT INFORMATION | 5, 6, 7 FOR 5, 10, 20 MHz | USE CONSTANT BANDWIDTH FOR SIMPLIFICATION |
| UE ID | 16 | CORRESPOND TO CRC LENGTH |
| TRANSPORT FORMAT INFORMATION | 0 | |
| TRANSMISSION POWER | 0 | |
| DEMODULATION REFERENCE SIGNAL FORMAT | 3 | SELECTION FROM DIFFERENT CYCLIC SHIFT INDICATES FOR MU-MIMO |
| TTI HOPPING INFORMATION (INTRA-TTI HOPPING) | 0 | |
| UPLINK ANTENNA SELECTION INFORMATION | 0 | |
| CQI INDICATION | 2 | SPECIFY FREQUENCY RESOLUTION |
| RETRANSMISSION-RELATED INFORMATION (HARQ-RELATED INFORMATION) | 0 | |

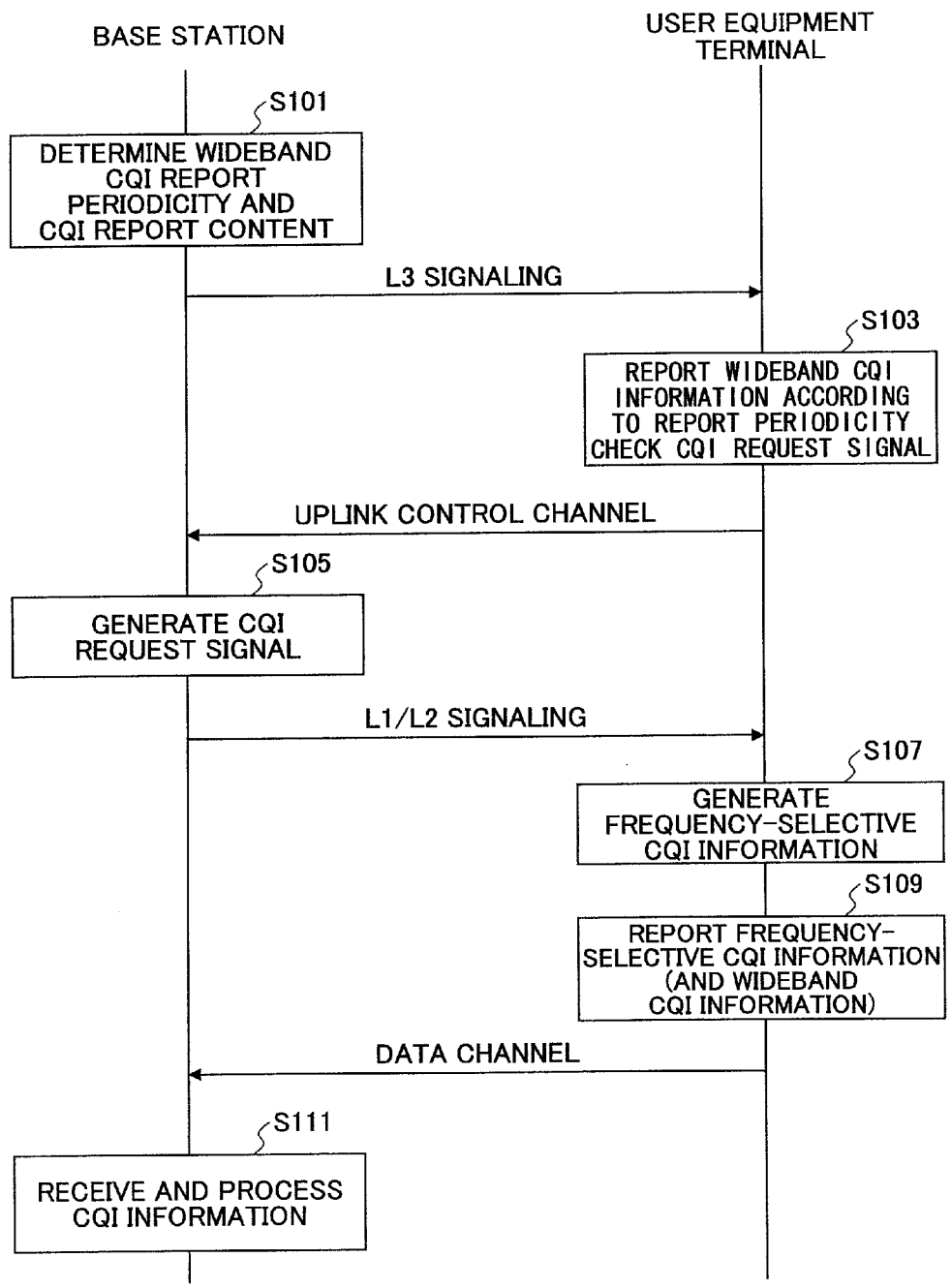

USER EQUIPMENT TERMINAL, BASE STATION AND CONTROL INFORMATION TRANSMISSION METHOD

TECHNICAL FIELD

The present invention relates to a user equipment terminal, a base station, and a control information transmission method.

BACKGROUND ART

As a next-generation system of the W-CDMA (Wideband Code Division Multiple Access) system and the HSDPA (High Speed Downlink Packet Access) system, an LTE (Long Term Evolution) system has been studied by the standards body referred to as 3GPP (3rd Generation Partnership Project). In the LTE system, a single carrier scheme (SC-FDMA: Single-Carrier Frequency Division Multiple Access) has been studied to be applied to uplink communications (see 3GPP TR 25.814 (V7.0.0), "Physical Layer Aspects for Evolved UTRA", June 2006, for example).

FIG. 1 shows an exemplary configuration of an uplink communication channel in LTE. As shown in FIG. 1, the system band is divided into plural frequency blocks. The frequency block is also referred to as a resource block, which is a minimum unit for assigning a band. In addition, the time domain is divided into transmission units referred to as subframes. The subframe is further divided into two slots.

The uplink communication channel includes an uplink shared channel (PUSCH: Physical Uplink Shared Channel) and uplink control channels A and B (PUCCHs: Physical Uplink Control Channels). User data are transmitted on the uplink shared channel. The uplink shared channel is also referred to as a data channel. Control information such as channel quality information (CQI: Channel Quality Indicator) used for AMC (Adaptive Modulation and Coding) and PMI (Precoding Matrix Indicator) representing antenna weights in the case of MIMO (Multiple Input Multiple Output) transmission is transmitted on the uplink control channels A and B. It should be noted that the uplink control channels A and B are mapped to different positions in two slots within a single subframe (frequency hopping is applied) (see R1-070100, "CDMA-Based Multiplexing Method for Multiple ACK/NACK and CQI in E-UTRA Uplink", January 2007, for example).

DISCLOSURE OF INVENTION

Problem(s) to be Solved by the Invention

As described above, CQI information is multiplexed into the uplink control channel. The CQI information includes system band CQI information representing channel quality in the whole system band and frequency-selective CQI information representing fluctuations in channel quality in the frequency direction. The frequency-selective CQI information includes channel quality information for each frequency block when the system band is divided into plural frequency blocks, and the frequency-selective CQI information is used for scheduling in a base station.

PMI information is also multiplexed into the uplink control channel. The PMI information includes system band PMI information representing PMI in the whole system band and frequency-selective PMI information representing fluctuations in PMI in the frequency direction. The frequency-selective PMI information includes PMI information for each frequency block when the system band is divided into plural frequency blocks, and the frequency-selective PMI information is used for frequency-selective precoding in a base station.

The amount of information in CQI information and PMI information increases with the increase in the number of frequency blocks divided from the system band (the amount of information in CQI information and PMI information increases with the fineness of frequency resolution). On the uplink control channel, the number of bits available for transmission is limited, and thus radio resources are periodically given to each user. Accordingly, when control information such as frequency-selective CQI information and frequency-selective PMI information is to be transmitted on the uplink control channel, there is a problem in that the number of bits of the control information may exceed the upper limit of the number of bits available for transmission on the uplink control channel.

In view of this problem, it is a general object of the present invention to avoid the increase in the amount of information on the uplink control channel when frequency-selective control information is transmitted in addition to wideband control information for the whole system band or a portion thereof.

Means for Solving the Problem(s)

In one aspect of the present invention, there is provided a user equipment terminal for transmitting control information to a base station according to a single carrier scheme, including:

a wideband control information generating unit configured to generate wideband control information for a whole system band or a portion thereof;

a frequency-selective control information generating unit configured to generate frequency-selective control information; and a control unit configured to control the wideband control information to be transmitted on a control channel or a data channel and control the frequency-selective control information to be transmitted on the data channel.

In another aspect of the present invention, there is provided a base station for receiving control information from a user equipment terminal according to a single carrier scheme, including:

an assigning unit configured to periodically assign radio resources in which frequency-selective control information is to be transmitted;

a frequency-selective control information requesting unit configured to request transmission of the frequency-selective control channel on a data channel using the periodically assigned radio resources; and a separating unit configured to separate the frequency-selective control information from the data channel.

In another aspect of the present invention, there is provided a control information transmission method in which control information is transmitted from a user equipment terminal to a base station according to a single carrier scheme, including the steps of:

periodically assigning, by the base station, radio resources in which frequency-selective control information is to be transmitted;

requesting, by the base station, transmission of the frequency-selective control channel on a data channel using the periodically assigned radio resources;

checking, by the user equipment terminal, the radio resources periodically assigned by the base station and generating the frequency-selective control information;

transmitting, by the user equipment terminal, the frequency-selective control information on the data channel; and separating, by the base station, the frequency-selective control information from the data channel.

Advantageous Effect of the Invention

According to an embodiment of the present invention, it is possible to avoid the increase in the amount of information on the uplink control channel when frequency-selective control information is transmitted in addition to wideband control information for the whole system band or a portion thereof.

BRIEF DESCRIPTION OF THE DRAWINGS

FIG. 6 shows a format of a CQI request signal in accordance with an embodiment of the present invention (in the case where a format for scheduling grant is used).

FIG. 7 shows a format of a CQI request signal in accordance with an embodiment of the present invention (in the case where a dedicated format is used).

FIG. 10 shows a flowchart of a control information transmission method in accordance with an embodiment of the present invention.

DETAILED DESCRIPTION OF THE PREFERRED EMBODIMENTS

Figure 1:
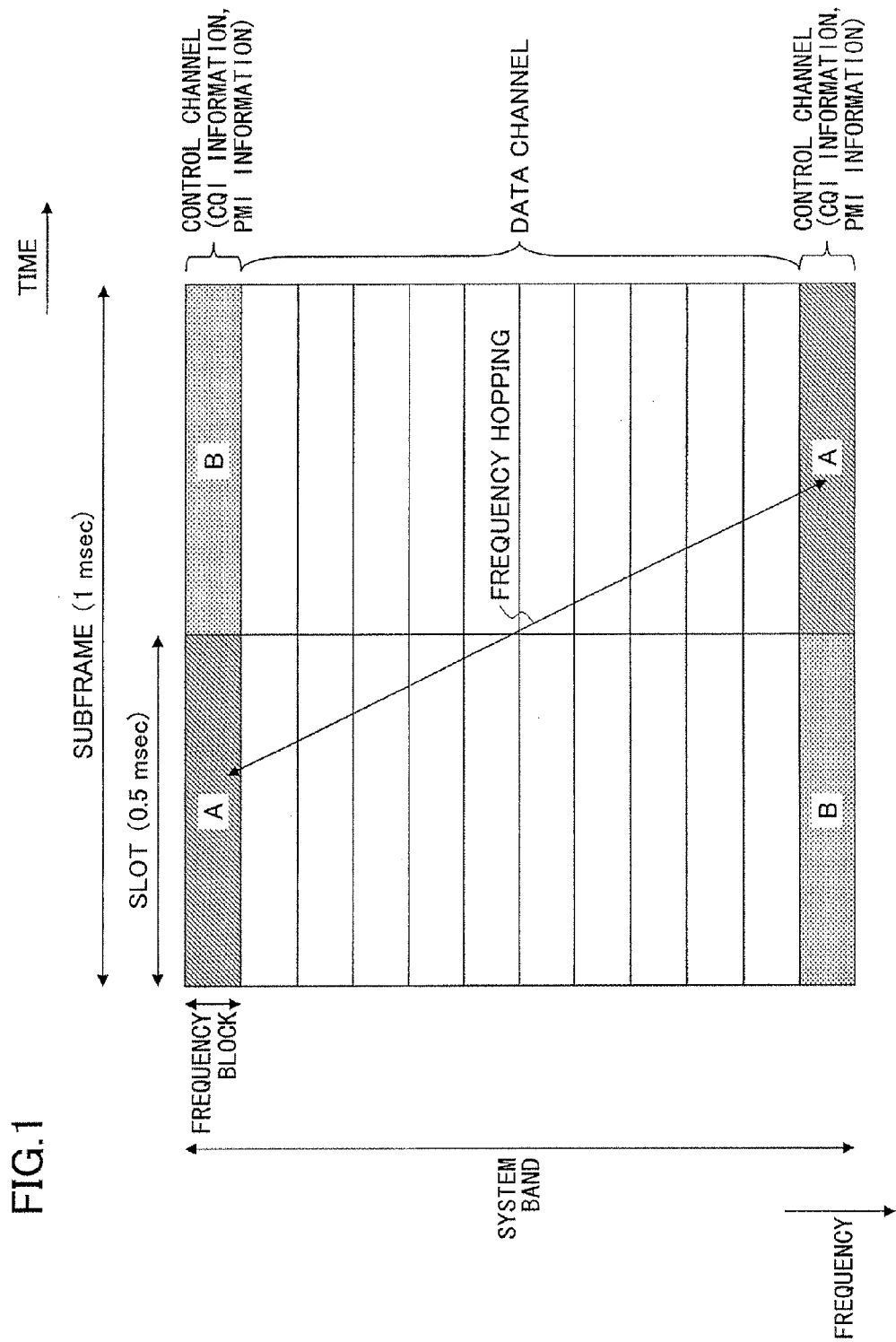
FIG. 1 shows an exemplary configuration of an uplink communication channel in LTE.

[Description of Notations]
10 user equipment terminal
101 CQI (PMI) measuring unit
103 wideband CQI (PMI) information generating unit
105 frequency-selective CQI (PMI) information generating unit
107 multiplex control unit
20 base station
201 multiplex determining unit
203 wideband CQI (PMI) information demodulating unit
205 frequency-selective CQI (PMI) information demodulating unit
207 scheduler
209 wideband CQI (PMI) information resource assigning unit

[Best Mode of Carrying Out the Invention]

With reference to the accompanying drawings, embodiments of the present invention are described below.

<Exemplary Configuration of an Uplink Communication Channel in Accordance with an Embodiment of the Present Invention>

Figure 2:
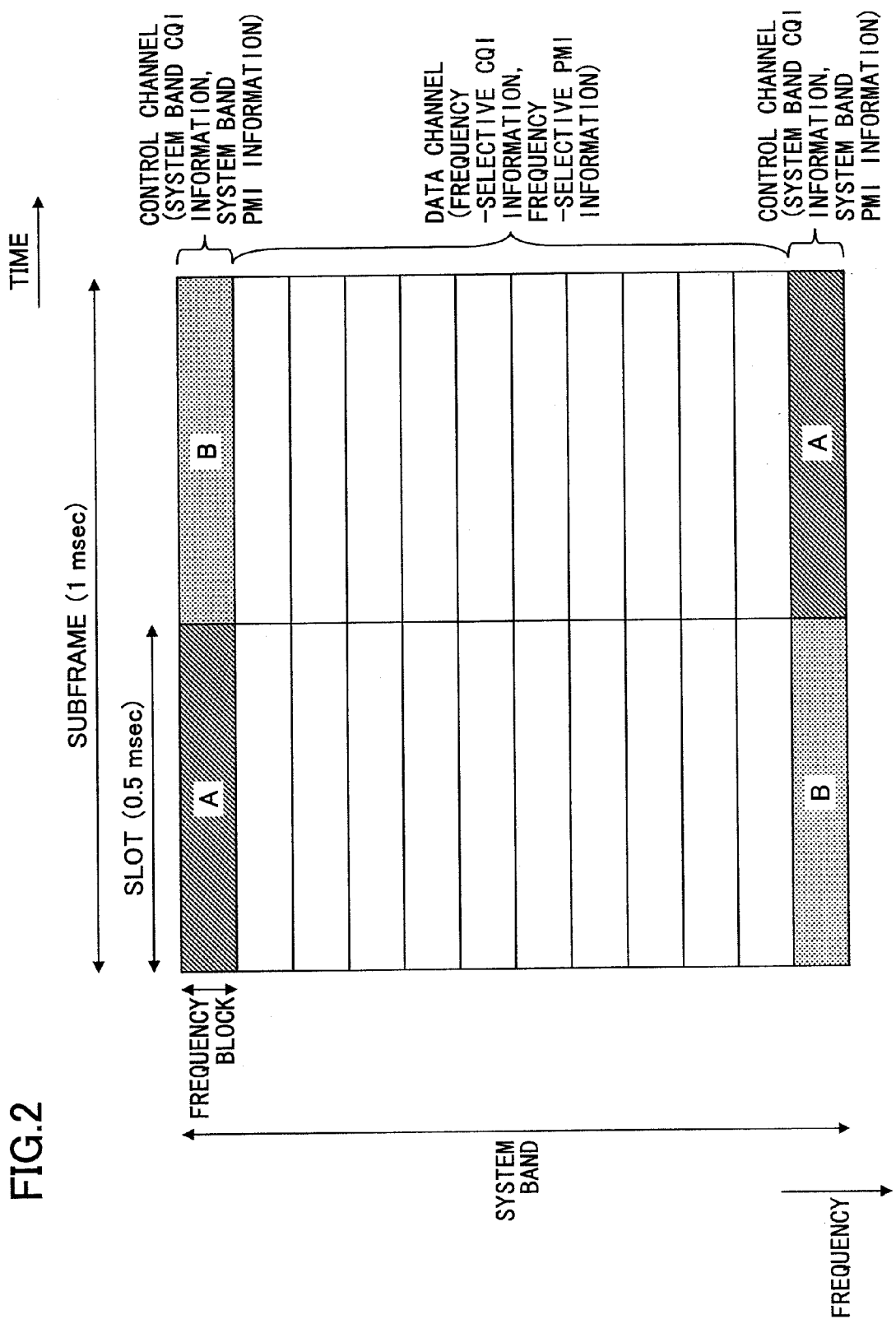
FIG. 2 shows an exemplary configuration of an uplink communication channel in accordance with an embodiment of the present invention.

FIG. 2 shows an exemplary configuration of an uplink communication channel in accordance with an embodiment of the present invention. In this embodiment, frequency-selective control information (frequency-selective CQI information and frequency-selective PMI information) is transmitted on the data channel. Wideband control information (system band CQI information and system band PMI information) is transmitted on the control channel.

Transmitting wideband control information on the control channel in this manner allows a base station to perform basic operations once the base station receives the control channel. On the other hand, the amount of information in frequency-selective control information varies depending on frequency resolution. Thus, assigning such variable-amount information (frequency-selective control information) to the data channel avoids the amount of information on the control channel increasing. It is preferable that wideband control information (system band CQI information and system band PMI information) be periodically transmitted on the control channel and frequency-selective control information (frequency-selective CQI information and frequency-selective PMI information) be transmitted on the data channel in response to a request signal from the base station.

Wideband control information to be transmitted on the control channel includes system band CQI information (system band CQI information for a first codeword; for example, five bits), system band CQI information for a second codeword in the case of MIMO transmission (a value relative to the system band CQI information for the first codeword; for example, two or three bits), and system band PMI information (for example, two or three bits). On the other hand, frequency-selective control information to be transmitted on the data channel includes frequency-selective CQI information (frequency-selective CQI information for a first codeword), frequency-selective CQI information for a second codeword in the case of MIMO transmission (a value relative to the frequency-selective CQI information for the first codeword), and frequency-selective PMI information. For example, in the case of a single antenna configuration, only the CQI information (system band CQI information and frequency-selective CQI information) is used as control information. In the case of MIMO transmission without precoding among antennas, the CQI information for the first codeword and the CQI information for the second codeword are used as control information. In the case of MIMO transmission with precoding among antennas, all sets of information are used as control information. Frequency-selective control information may further include control information for a scheduling request.

While embodiments of the present invention focus on the case where system band control information (system band CQI information, system band PMI information, etc.) is transmitted on the control channel, the present invention is also applicable to the case where wideband control information for a portion of the whole system band (CQI information for a portion of the whole system band, PMI information for a portion of the whole system band, etc.) is transmitted on the control channel. In other words, wideband control information includes not only control information for the whole system band but also control information for a portion of the whole system band. Similarly, wideband CQI information includes not only CQI information for the whole system band but also CQI information for a portion of the whole system band, and wideband PMI information includes not only PMI information for the whole system band but also PMI information for a portion of the whole system band.

<Example of Radio Resource Assignment of CQI Request Signals>

As described above, it is preferable that wideband control information be periodically transmitted from the user equipment terminal to the base station. The control information and the transmission periodicity of the control information are reported to each user equipment terminal by means of high-layer signaling (L3 (layer-3) signaling).

On the other hand, it is preferable that frequency-selective control information be transmitted on the data channel from the user equipment terminal to the base station in response to a CQI request signal (or PMI request signal) from the base station.

The CQI request signal (or PMI request signal) may be provided to the user equipment terminal either by adding a request flag to a format for uplink scheduling grant or by using a dedicated format.

When the format for uplink scheduling grant is used for the CQI request signal (or PMI request signal), the user equipment terminal receives and decodes the uplink scheduling grant and checks whether the request signal is included in the uplink scheduling grant.

Figure 3:
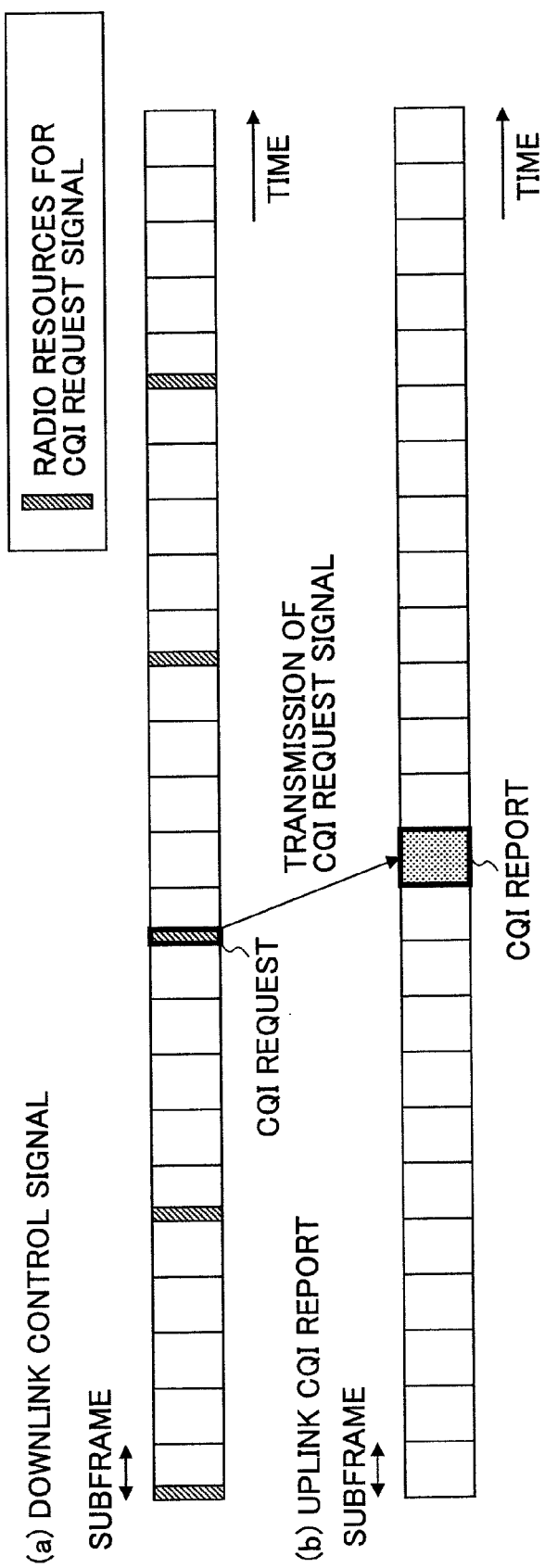
FIG. 3 shows an example of radio resource assignment of CQI request signals in accordance with an embodiment of the present invention.

As shown in FIG. 3, when the dedicated format is used for the CQI request signal, subframes to which the CQI request signal is assigned may be periodically determined in advance. The base station transmits the CQI request signal in each of the periodically determined subframes. When CQI information is not needed, the base station may not transmit the CQI request signal. The user equipment terminal can receive and decode signals only in subframes to which the CQI request signal can be assigned, and then check whether the request signal is included. The subframes to which the CQI request signal can be assigned may be reported in advance from the base station to the user equipment terminal. Alternatively, the subframes to which the CQI request signal can be assigned may be associated with subframes in which wideband control information is periodically transmitted, as described below with reference to FIGS. 4 and 5. An UE ID (User Equipment Identifier) is added to the CQI request signal. In other words, encoding is separately performed among user equipment terminals.

The use of the dedicated format allows for a simpler format with a smaller number of bits compared to the approach which adds the request flag to the format for uplink scheduling grant.

Figure 4:
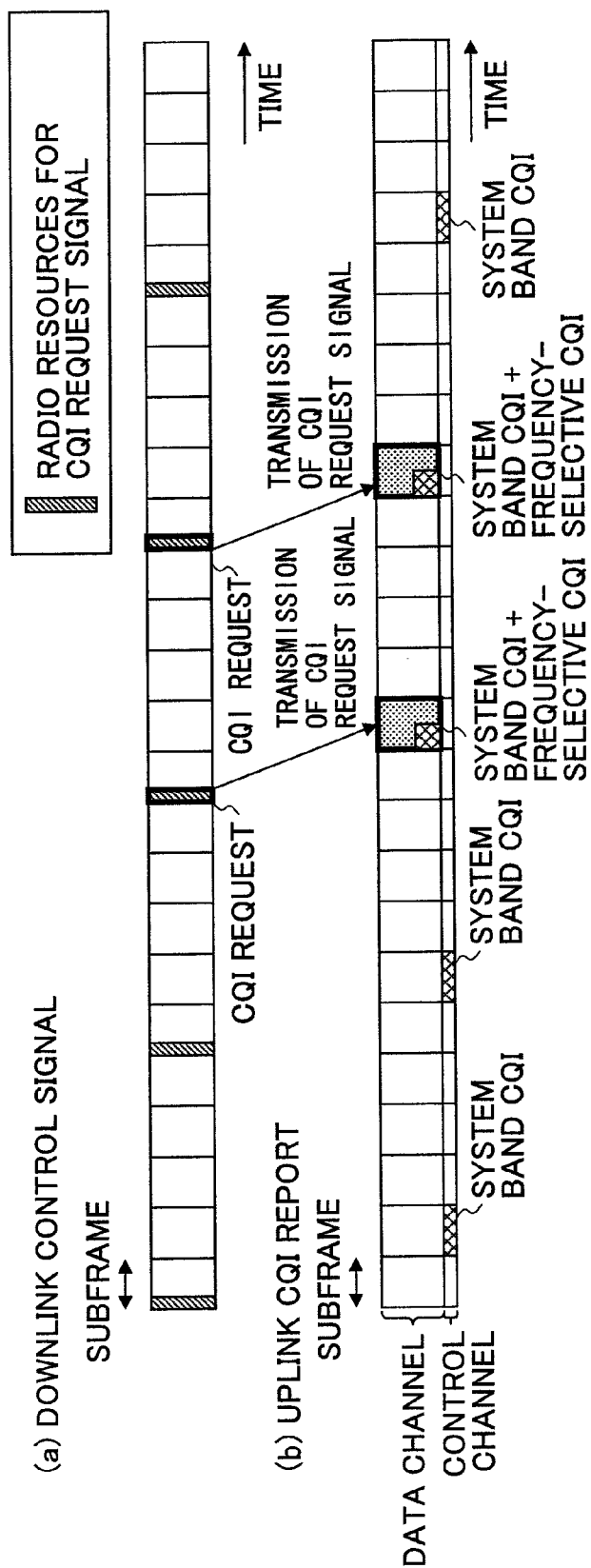
FIG. 4 shows a first example of a time-relationship between subframes for system band CQI information and subframes for frequency-selective CQI information.

FIG. 4 shows a time-relationship between subframes for system band CQI information and subframes for frequency-selective CQI information, when the CQI request signal is transmitted with the dedicated format. As shown in FIG. 4, the base station may determine transmission timings such that system band CQI information and frequency-selective CQI information are transmitted in the same subframe. Since the base station recognizes in advance subframes in which system band CQI information is transmitted, the base station transmits the CQI request signal such that frequency-selective CQI information is transmitted in the same subframe as system band CQI information. In other words, the radio resource in which the base station transmits the CQI request signal to the user equipment terminal is determined based on the transmission timing of system band CQI information. When the base station does not transmit the CQI request signal, the user equipment terminal periodically transmits system band CQI information on the control channel. When the base station transmits the CQI request signal, the user equipment terminal transmits system band CQI information and frequency-selective CQI information on the data channel. In this manner, the base station may determine in advance subframes to which the CQI request signal can be assigned.

Figure 5:
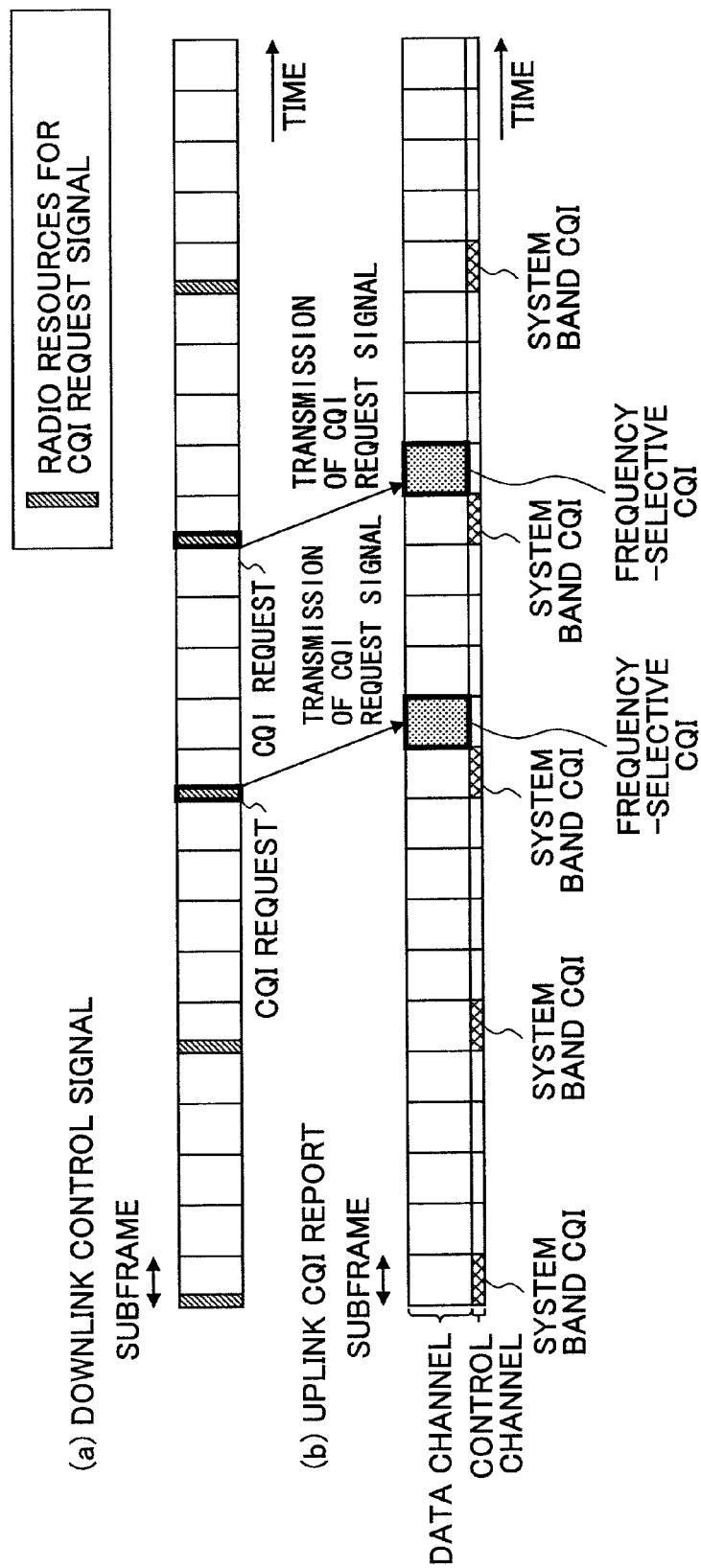
FIG. 5 shows a second example of a time-relationship between subframes for system band CQI information and subframes for frequency-selective CQI information.

FIG. 5 shows a time-relationship between subframes for system band CQI information and subframes for frequency-selective CQI information, when the CQI request signal is transmitted with the dedicated format. As shown in FIG. 5, the base station may determine transmission timings such that system band CQI information and frequency-selective CQI information are transmitted in different subframes. Since the base station recognizes in advance subframes in which system band CQI information is transmitted, the base station transmits the CQI request signal such that frequency-selective CQI information is transmitted in a different subframe from system band CQI information (or in a subframe with a predetermined offset from system band CQI information). In other words, the radio resource in which the base station transmits the CQI request signal to the user equipment terminal is determined based on the transmission timing of system band CQI information. When the base station does not transmit the CQI request signal, the user equipment terminal periodically transmits system band CQI information on the control channel. When the base station transmits the CQI request signal, the user equipment terminal continues to periodically transmit system band CQI information on the control channel and transmits frequency-selective CQI information on the data channel in a different subframe from system band CQI information. In this manner, the base station may determine in advance subframes to which the CQI request signal can be assigned.

<Format of a CQI Request Signal>

As described above, the CQI request signal may be provided to the user equipment terminal either by adding the request flag to the format for uplink scheduling grant or by using the dedicated format.

FIG. 6 shows a format of the CQI request signal in the case where the format for scheduling grant is used.

The format for scheduling grant includes a scheduling grant format, uplink resource block assignment information, an UE ID, transport format information, transmission power, a demodulation reference signal format, TTI hopping information (intra-TTI hopping), uplink antenna selection information, and retransmission-related information (HARQ-related information). For the purpose of transmitting the CQI request signal with the format for scheduling grant, the format for scheduling grant may also include CQI indication with one bit. The CQI indication is a flag indicating whether frequency-selective CQI information is transmitted on the data channel (PUSCH). The user equipment terminal reads the CQI indication to determine whether to transmit frequency-selective CQI information.

FIG. 7 shows a format of the CQI request signal in the case where the dedicated format is used. When the dedicated format is used, only minimum information may be defined. Thus, a simpler format with a smaller number of bits may be used for the dedicated format. Specifically, only uplink resource block assignment information, an UE ID, and CQI indication may be defined in the dedicated format. The dedicated format may or may not include a demodulation reference signal format with three bits. The amount of information in the uplink resource block allocation information can be reduced by keeping the amount of information for transmission of the CQI constant.

<Configuration of a User Equipment Terminal>

Figure 8:
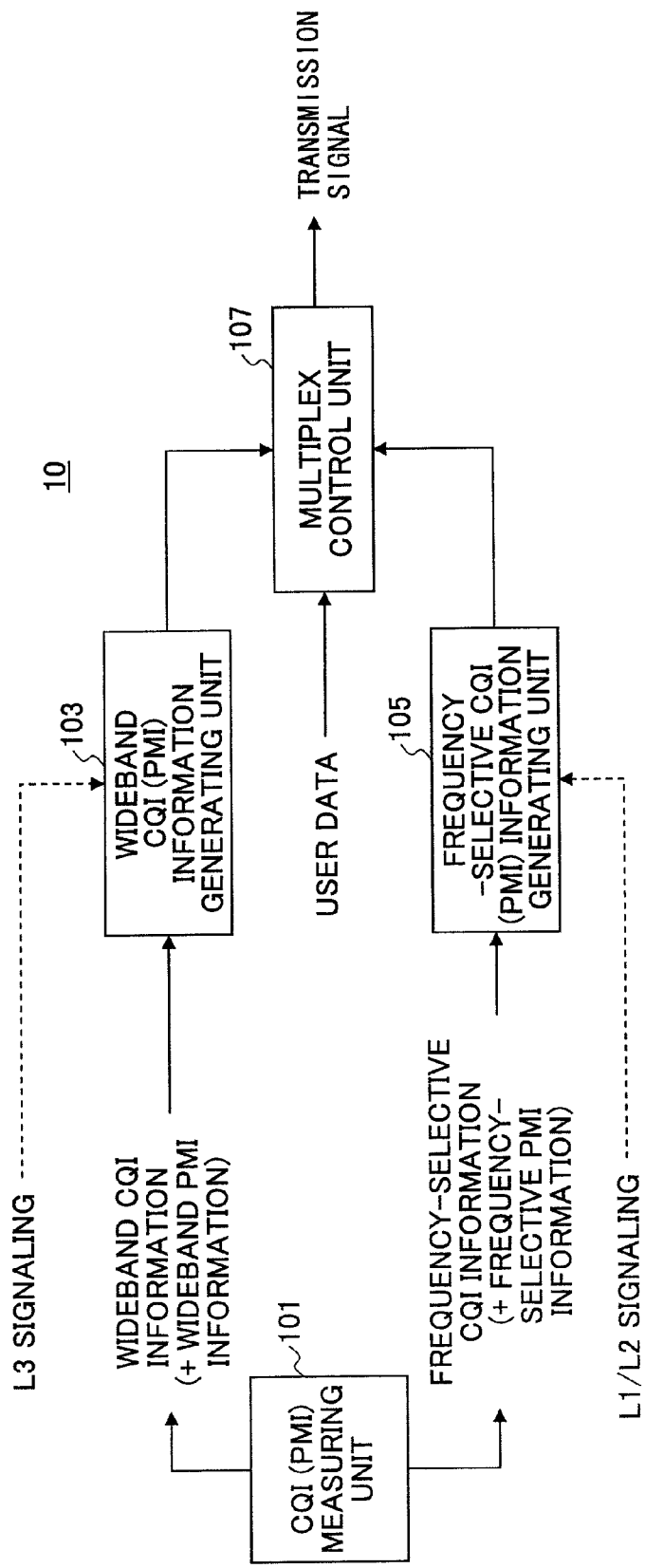
FIG. 8 shows a block diagram of a user equipment terminal in accordance with an embodiment of the present invention.

With reference to FIG. 8, a configuration of a user equipment terminal 10 is described below in accordance with an embodiment of the present invention.

The user equipment terminal 10 include a CQI measuring unit 101, a wideband CQI information generating unit 103, a frequency-selective CQI information generating unit 105, and a multiplex control unit 107.

The CQI measuring unit 101 receives reference signals transmitted from the base station and measures CQI.

The wideband CQI information generating unit 103 averages CQI for each frequency block which is measured by the CQI measuring unit, and then generates wideband CQI information. The periodicity of generating wideband CQI information is reported in advance from the base station by means of L3 signaling.

The frequency-selective CQI information generating unit 105 generates CQI information for each predetermined frequency block upon receiving a CQI request signal from the base station by means of L1/L2 signaling. The radio resource used to receive the CQI request signal by means of L1/L2 signaling may be periodically assigned by the base station in advance. For example, subframes in which frequency-selective CQI information is reported may be associated with subframes in which wideband CQI information is reported.

The multiplex control unit 107 multiplexes user data, the wideband CQI information, and the frequency-selective CQI information into the data channel and the control channel. For example, when the wideband CQI information and the frequency-selective CQI information are transmitted in the same subframe, the multiplex control unit 107 multiplexes the user data, the wideband CQI information, and the frequency-selective CQI information into the data channel. When the wideband CQI information and the frequency-selective CQI information are transmitted in different subframes, the multiplex control unit 107 multiplexes the user data and the frequency-selective CQI information into the data channel and multiplexes the wideband CQI information into the control channel.

<Configuration of a Base Station>

Figure 9:
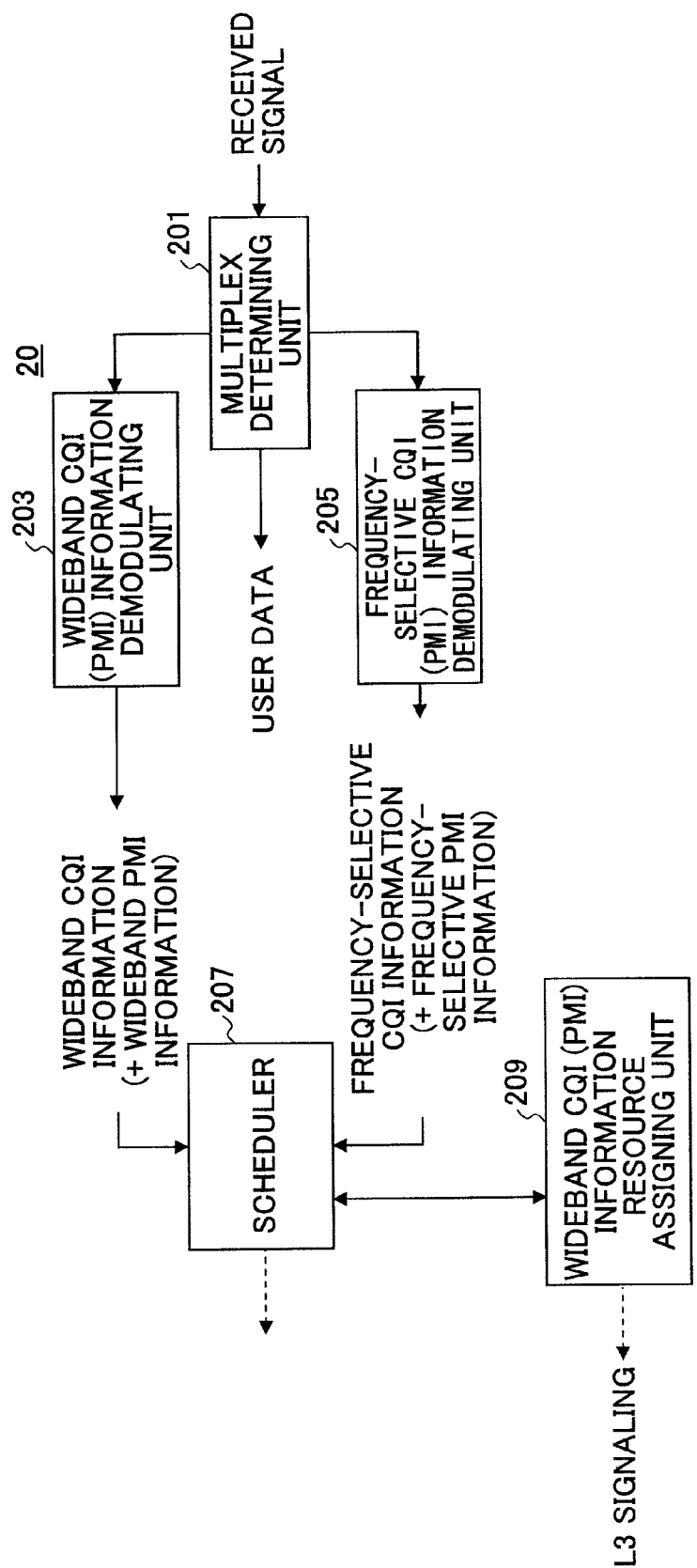
FIG. 9 shows a block diagram of a base station in accordance with an embodiment of the present invention.

With reference to FIG. 9, a configuration of a base station 20 is described below in accordance with an embodiment of the present invention.

The base station 20 includes a multiplex determining unit 201, a wideband CQI information demodulating unit 203, a frequency-selective CQI information demodulating unit 205, a scheduler 207, and a wideband CQI information resource assigning unit 209.

The wideband CQI information resource assigning unit 209 periodically assigns radio resources used by the user equipment terminal to transmit wideband CQI information. The transmission periodicity of the wideband CQI information is reported to the user equipment terminal by means of L3 signaling.

The multiplex determining unit 201 determines whether user data, wideband CQI information, and frequency-selective CQI information are multiplexed into the user channel (data channel) and separates the pieces of information. It should be noted that the multiplex determining unit 201 corresponds to a separating unit.

The wideband CQI information demodulating unit 203 demodulates wideband CQI information multiplexed into the user channel (data channel) or the control channel.

The frequency-selective CQI information demodulating unit 205 demodulates frequency-selective CQI information multiplexed into the user channel (data channel).

The scheduler 207 performs scheduling of user data based on the wideband CQI information and the frequency-selective CQI information. The scheduler 207 also performs scheduling for transmission of CQI request signals for the purpose of receiving frequency-selective CQI information from the user equipment terminal. For example, the CQI request signals are transmitted based on the transmission periodicity of wideband CQI information managed by the wideband CQI information resource assigning unit 209, such that frequency-selective CQI information is received in the same subframe as or in a different subframe from wideband CQI information. It should be noted that the scheduler 207 corresponds to a frequency-selective control information requesting unit.

<Flowchart of a Control Information Transmission Method>

With reference to FIG. 10, a flowchart of a control information transmission method is described below in accordance with an embodiment of the present invention.

First, the base station determines the CQI report periodicity of wideband CQI information and the content of the CQI report (information about whether system band CQI information for a first codeword is to be transmitted or whether system band CQI information for first and second codewords is to be transmitted, etc.), and then reports them to the user equipment terminal by means of L3 signaling (S101). The user equipment terminal generates wideband CQI information according to the CQI report periodicity and reports it to the base station. The wideband CQI information is transmitted on the uplink control channel. Since a subframe for receiving a CQI request signal can be determined according to the CQI report periodicity, the user equipment terminal receives the subframe to check the CQI request signal (S103). Step S103 is repeated with the periodicity reported in step S101.

When frequency-selective CQI information is needed, the base station generates a CQI request signal and transmits it to the user equipment terminal by means of L1/L2 signaling (S105). The user equipment terminal receives the CQI request signal and generates frequency-selective CQI information (S107). The frequency-selective CQI information is transmitted with the radio resource on the data channel according to an instruction from the base station (S109). When wideband CQI information is transmitted in the same subframe as the frequency-selective CQI information, the wideband CQI information is also transmitted on the data channel. When wideband CQI information is transmitted in a different subframe from the frequency-selective CQI information, the wideband CQI information is transmitted on the uplink control channel. The base station receives the frequency-selective CQI information and uses it for frequency scheduling.

While FIGS. 3-10 and their corresponding detailed description refer to CQI information, the present invention is similarly applicable to PMI information.

As described above, according to an embodiment of invention, it is possible to efficiently use the uplink control channel and the uplink data channel when frequency-selective control information is transmitted in addition to wideband control information for the whole system band or a portion thereof. While the present invention is described with reference to the preferred embodiments of the present invention, the present invention is not limited to these embodiments but may be modified or changed within the scope of the claims. For example, the present invention is not limited to a mobile communication system according to LTE, but is applicable to any mobile communication system in which an uplink control channel is transmitted according to a single carrier scheme. Furthermore, while the present invention is described using examples of CQI information and PMI information for wideband control information and frequency-selective control information, the present invention is applicable to any control information which can be divided into wideband control information and frequency-selective control information.

This international patent application is based on Japanese Priority Application No. 2007-258110 filed on Oct. 1, 2007, the entire contents of which are incorporated herein by reference.

The invention claimed is:

1. A user equipment terminal, comprising:
a first transmitting unit configured to transmit, on a control channel, CQI information which is to be periodically transmitted,
  wherein resource blocks at both ends of plural resource blocks making up a system band are available for transmission on the control channel and resource blocks between the resource blocks available for transmission on the control channel are available for transmission on a data channel; and
a second transmitting unit configured to transmit, on the data channel, CQI information which is to be non-periodically transmitted.

2. The user equipment terminal as claimed in claim 1,
wherein the first transmitting unit transmits, on the control channel, wideband CQI information; and
wherein the second transmitting unit transmits, on the data channel, CQI information on a frequency block basis, wherein the system band is divided into plural frequency blocks.

3. The user equipment terminal as claimed in claim 1, further comprising:
a control unit configured to control wideband CQI information and frequency-selective CQI information to be transmitted on the data channel, when the wideband CQI information and the frequency-selective CQI information are transmitted at a same timing,
wherein the system band is divided into plural frequency blocks and the frequency-selective CQI information is formed on a frequency block basis.

4. A transmission method, comprising the steps of:
transmitting, on a control channel, CQI information which is to be periodically transmitted, wherein resource blocks at both ends of plural resource blocks making up a system band are available for transmission on the control channel and resource blocks between the resource blocks available for transmission on the control channel are available for transmission on a data channel; and
transmitting, on the data channel, CQI information which is to be non-periodically transmitted.

5. A communication system including a user equipment terminal and a base station apparatus, the user equipment terminal comprising:
a first transmitting unit configured to transmit to the base station apparatus, on a control channel, CQI information which is to be periodically transmitted,
  wherein resource blocks at both ends of plural resource blocks making up a system band are available for transmission on the control channel and resource blocks between the resource blocks available for transmission on the control channel are available for transmission on a data channel; and
a second transmitting unit configured to transmit to the base station apparatus, on the data channel, CQI information which is to be non-periodically transmitted.

* * * * *